Figure 1:
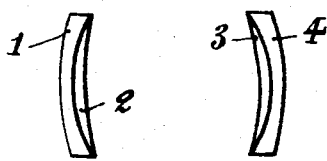

May 17, 1927.

A. POLACK 1,629,361

HYPERCHROMATIC OBJECTIVE

Filed July 31, 1923

Inventor
Aron Polack
By
Mauro, Cameron, Lewis & Kirkam
Attorneys.

Patented May 17, 1927.

1,629,361

UNITED STATES PATENT OFFICE.

ARON POLACK, OF PARIS, FRANCE.

HYPERCHROMATIC OBJECTIVE.

Application filed July 31, 1923, Serial No. 654,954, and in France August 1, 1922.

The present invention is based upon a new fact which consists in the possibility of obtaining distinct images, with soft outline, on ortho or panchromatic plates, by means of non-chromatic objectives and without correction of the visual focussing.

It has been known since the beginning of photography that the said objectives can give diffused images only upon ordinary plates when the focussing effected by sight is not corrected by calculations or by any other means capable of placing the sensitive plate in the plane of intersection of the chemical radiations.

Experiments carried out with a very dispersive objective have shown that, without rectifying the focussing, it is possible to obtain distinct images with soft outline, when the ordinary plate is replaced by ortho or panchromatic plates. The more similar is the curve of sensitivity, relatively to the various radiations of the spectrum, given by plates with their compensating screen, to that given by the retina, the more distinct is the image. This experimental fact is of the highest importance, it allows of giving a new direction to the photography, rendering it more artistic, more pictorial and this on an essentially physiological basis, because our visual apparatus uses also a panchromatic plate, the retina, a compensating screen, the yellow pigment of the macula and an optical system of large opening, not at all achromatic, consisting of the cornea, of the crystallin and of the iris diaphragm. The eye also produces images having a soft outline which are not at all similar to the sharp outlines given by the classic objectives. The latter are of course precious for the documentary photography which requires precision in the details, but cannot be suitable for the pictorial photography, the object of which is to reproduce the nature such as it is seen by the painter-colourist.

The hyperchromatic objective according to the present invention fulfills the above requirement.

It is characterized by a correction, as complete as possible of geometrical and physical aberrations and by its methodical amplification of the chromaticity, or chromatic aberration, of the focal planes. The physical and geometrical aberrations include the following: (a) spherical aberration; (b) astigmatism and the coma; (c) distortions; (d) curvature of the field; and (e) chromatism of principal planes. The corrections for the above aberrations are calculated for the yellow ray so that for sodium light the objective acts like the best of the classical objectives.

Several embodiments of the present invention are illustrated in Figures 1 to 4 inclusive, of the accompanying drawings. It is to be expressly understood, however, that the drawings are for purposes of illustration only and do not constitute a definition of the limits of the invention, reference being had to the appended claims for this purpose.

It is possible to construct hydrochromatic objectives, or objectives wherein the chromaticity or chromatic aberration of the focal planes is amplified, by starting from the general principles which serve as a guide in the construction of ordinary objectives. A judicious choice of the dispersions will allow of introducing the necessary chromaticity.

Here are a few examples:—

A. Rectilineal objectives, Fig. 1.

It is known that these objectives consist of two menisci separately achromatized; the divergent glasses (1 and 4) being more refracting and more dispersive than the convergent elements 2 and 3.

In a hyperchromatic objective of this type, a glass will be chosen for 1 and 4, which is more refracting but less dispersive than that used for 2 and 3. Each doublet will consist for instance, of a divergent meniscus of crown barium and of a convergent meniscus of light flint.

B. Anastigmats.

In such objectives, one at least of the elements is abnormal, that is the convergent lens is cut in a more refracting and less dispersive glass than that used for the divergent lens.

By maintaining the basic indices, but choosing other dispersions, it is possible to convert such objectives, at the cost generally of some adaptations, into hyperchromatic objectives.

The two types of anastigmatic lenses from which all the others derive more or less directly, are the adhering triplet (or the double symmetrical objective consisting of two triplets) and Taylor's triplet.

Figure 2:
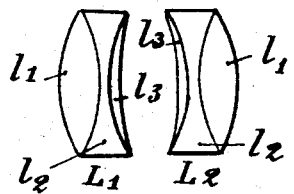

(a) Adhering triplet (Fig. 2).

It is sufficient to consider the lens $L_1$ alone ($L_2$ is indeed identical to $L_1$, except for the sign).

The most usual:—

$n_1 > n_2 > n_3$, $l_1$ being a crown barium of high refracting and small dispersing power, $l_2$ being a flint baryta or a light flint and $l_3$, an ordinary crown.

It is possible to introduce here the hyperchromaticity in three different ways:

(1) By replacing the crown barium by an ordinary flint, (2) by replacing the flint baryta or the light flint by a light crown barium, and (3) by effecting the two substitutions simultaneously.

Of course, the new glasses will not have generally the indices of the old ones, and it will be necessary to effect the usual adaptations each time that the melting is changed.

Figure 3:
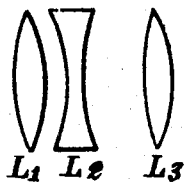

(b) Taylor's triplet (Fig. 3).

In this classic type, $L_1$ and $L_3$ are convergent and are cut in crown barium, $L_2$ is divergent and consists of ordinary flint.

For a hyperchromatic lens, the crown barium will be replaced by flint and the flint by a crown barium.

Figure 4:
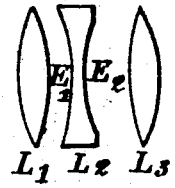

We give below, by way of example, a hyperchromatic triplet: (Fig. 4).

Relative opening F: 7

$L_1 R_1 = +18,30 \quad e_1 = 3,35$
$R_2 = -111,72$
$E_1 = 1.00$
$L_2 R_3 = -52,92 \quad e_2 = 1,47$
$R_4 = +17,19$
$E_2 = 7.16$
$L_3 R_5 = +452.90 \quad e_3 = 2,81.$
$R_6 = -57,26$ Indices of $L_1$: $n_c = 1,61396$, $n_d = 1,61881$, $n_t$ 1,63100 flint.

Indices of $L_2$: $n_c = 1,56966$, $n_d = 1,57256$, $n_t$ 1,57949 crown barium.

Indices of $L_3$: $n_c = 1,55571$, $n_d = 1,55927$, $n_t$ 1,56803 flint.

The focal distances are:—

$F_c = 101,85 \quad F_d = 100,00 \quad F_t = 95,54.$

Those of a single flint lens would be:—

$F_c = 100,78 \quad F_d = 1000,00 \quad F_t = 98.07.$

The objective is therefore really hyperchromatic. In the case when a more moderate chromaticity, similar for instance to that of the eye, is desirable, it will be easily obtained by choosing intermediate dispersions between those of a corrected objective and that of a hyperchromatic objective.

Thus constituted, the hyperchromatic objectives give interesting results; they increase the depth of the field, soften the outlines, suppress the useless details, thus doing away with retouching, and increase the plastic effect. This objective gives also, good results in colour photography on the conditions of examining the proofs at a suitable distance.

Having now particularly described and ascertained the nature of my said invention and in what manner the same is to be performed, I declare that what I claim is:—

1. An objective for obtaining distinct images with soft outline corrected for all geometrical and physical aberrations except the chromaticity of its focal plane which is amplified.

2. An objective for obtaining distinct images with soft outline comprising a compound lens corrected for all geometrical and physical aberrations other than the chromaticity of its focal plane, which chromaticity is amplified.

In testimony whereof I have signed this specification.

ARON POLACK.